US008696295B2

(12) United States Patent
Robinson (10) Patent No.: US 8,696,295 B2
(45) Date of Patent: Apr. 15, 2014

(54) UTILITY LIFT HAULER CONFIGURED TO TRANSPORT MOTORCYCLES, ATVS AND THE LIKE

(76) Inventor: Brad Robinson, Henderson, NV (US)

( * ) Notice: Subject to any disclaimer, the term of this patent is extended or adjusted under 35 U.S.C. 154(b) by 240 days.

(21) Appl. No.: 13/014,160

(22) Filed: Jan. 26, 2011

(65) Prior Publication Data

US 2012/0189415 A1 Jul. 26, 2012

(51) Int. Cl.
*B60P 1/44* (2006.01)
*B60P 3/07* (2006.01)
*B60P 3/077* (2006.01)

(52) U.S. Cl.
USPC ............... 414/466; 414/462; 280/769

(58) Field of Classification Search
CPC ............... B60P 1/16; B60P 1/18; B60P 1/22; B60P 1/32; B60P 1/34; B60P 1/44; B60P 1/4414; B60P 1/4421; B60P 1/4485; B60P 1/4492; B60P 1/445; B60P 3/073; B60P 3/075; B60P 3/12; B60P 3/122; B60P 3/06; B60P 3/07; B60P 3/077
USPC ........... 280/769; 414/462, 463, 464, 465, 466
IPC ..................... B60P 1/18, 1/22, 1/32, 1/34, 1/44, B60P 3/06, 3/07, 3/12, 3/073, 3/075, 3/077, B60P 3/363
See application file for complete search history.

(56) References Cited

U.S. PATENT DOCUMENTS

| | | | | |
|---|---|---|---|---|
| 3,237,921 A | * | 3/1966 | Jay | 254/122 |
| 4,678,392 A | * | 7/1987 | Capers et al. | 414/563 |
| 4,724,930 A | * | 2/1988 | VanLierop | 187/204 |
| 4,797,057 A | * | 1/1989 | Shoup et al. | 414/563 |
| 4,927,315 A | * | 5/1990 | Nespor | 414/563 |
| 4,948,327 A | * | 8/1990 | Crupi, Jr. | 414/563 |
| 5,322,143 A | * | 6/1994 | Curran | 187/211 |
| 5,326,216 A | * | 7/1994 | Russ | 414/563 |
| 5,456,564 A | * | 10/1995 | Bianchini | 414/462 |
| 5,839,875 A | | 11/1998 | Miller et al. | |
| 6,579,055 B1 | * | 6/2003 | Williams | 414/462 |
| 6,884,018 B1 | | 4/2005 | Dugan et al. | |
| 7,066,448 B2 | | 6/2006 | Thurm | |
| 7,318,698 B1 | * | 1/2008 | Gipson | 414/563 |
| 2001/0001636 A1 | * | 5/2001 | Klinkenberg | 414/462 |
| 2002/0110445 A1 | * | 8/2002 | Odegaard | 414/563 |
| 2005/0129490 A1 | | 6/2005 | Hutchins | |
| 2006/0062657 A1 | | 3/2006 | Davis | |
| 2006/0072999 A1 | * | 4/2006 | Manley | 414/563 |
| 2007/0065262 A1 | | 3/2007 | Murphy | |
| 2008/0085176 A1 | | 4/2008 | Statkus | |
| 2008/0206030 A1 | * | 8/2008 | Reuille et al. | 414/462 |

FOREIGN PATENT DOCUMENTS

WO      WO 88-03484 A1     5/1988

* cited by examiner

*Primary Examiner* — Saul Rodriguez
*Assistant Examiner* — Brendan Tighe
(74) *Attorney, Agent, or Firm* — Rob L. Phillips; Greenberg Traurig, LLP (57) ABSTRACT

An automated lift hauler configured for attachment to a vehicle frame near a rear of the vehicle. When not in use, the lift hauler is substantially concealed beneath the vehicle. During use, the lift hauler extends from beneath the vehicle such that large items may be supported by a lift hauler platform. One or more hydraulically-driven pistons move the lift hauler from a concealed position beneath the vehicle to a use position rearward of the vehicle. The lift hauler comprises a series of frame members and utilizes a scissor design to facilitate movement between a lower position, which allows large items to be loaded on a lift hauler platform, to a raised position which allows the large items to restrained and transported. Operating the lift hauler may be accomplished using a remote control or in-cab control panel or mounted control panel near the rear of the vehicle.

15 Claims, 7 Drawing Sheets

UTILITY LIFT HAULER CONFIGURED TO TRANSPORT MOTORCYCLES, ATVS AND THE LIKE

FIELD OF THE INVENTION

The embodiments of the present invention relate to a lift hauler affixed to a vehicle and configured to transport motorcycles, ATVs and the like.

BACKGROUND

People seemingly are traveling more and also participating in outdoor activities with greater frequency. To that end, people are purchasing more trucks and SUVs to transport large items, such as motorcycles, ATVs, jet skis, wave runners and the like. Placing such equipment in the bed of a pick up truck, for example, however usurps all available space and limits the ability to transport other items. Moreover, loading such equipment into the bed of a truck or back of an SUV, can be difficult given the weight of the equipment.

Thus, there is a need for an automated lift hauler affixed to a vehicle (e.g., truck) for retaining large items for transport. Advantageously, the automated lift hauler should be substantially concealed when not in use.

SUMMARY

Accordingly, a first embodiment of the present invention is an automated lift hauler configured for attachment to a vehicle frame near a rear of the vehicle. When not in use, the lift hauler is substantially concealed beneath the vehicle. During use, the lift hauler extends from beneath the vehicle such that large items may be supported by a lift hauler platform. In one embodiment, one or more hydraulically driven pistons activate the lift hauler and move the lift hauler platform from a substantially concealed position beneath the vehicle to a use position rearward of the vehicle. Other means such as air driven pistons may be used as well to drive the lift.

In one embodiment, the lift hauler comprises a series of frame members and utilizes a scissor design to facilitate movement between a lower position, which allows large items to be loaded on a lift hauler platform, to a raised position which allows the large items to restrained and transported. Operating the lift hauler may be accomplished using a remote control or in-cab control panel or mounted control panel near the rear of the vehicle.

Other variations, embodiments and features of the present invention will become evident from the following detailed description, drawings and claims.

DETAILED DESCRIPTION

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

The embodiments of the present invention are directed to an automated lift hauler which is affixed to the frame of a vehicle. The lift hauler is configured to automatically extend from beneath the vehicle such that large items may be loaded onto a lift hauler platform and transported behind the vehicle. When the large items are unloaded, the lift hauler is automatically moved beneath the vehicle such that the lift hauler is substantially concealed.

Figure 1:
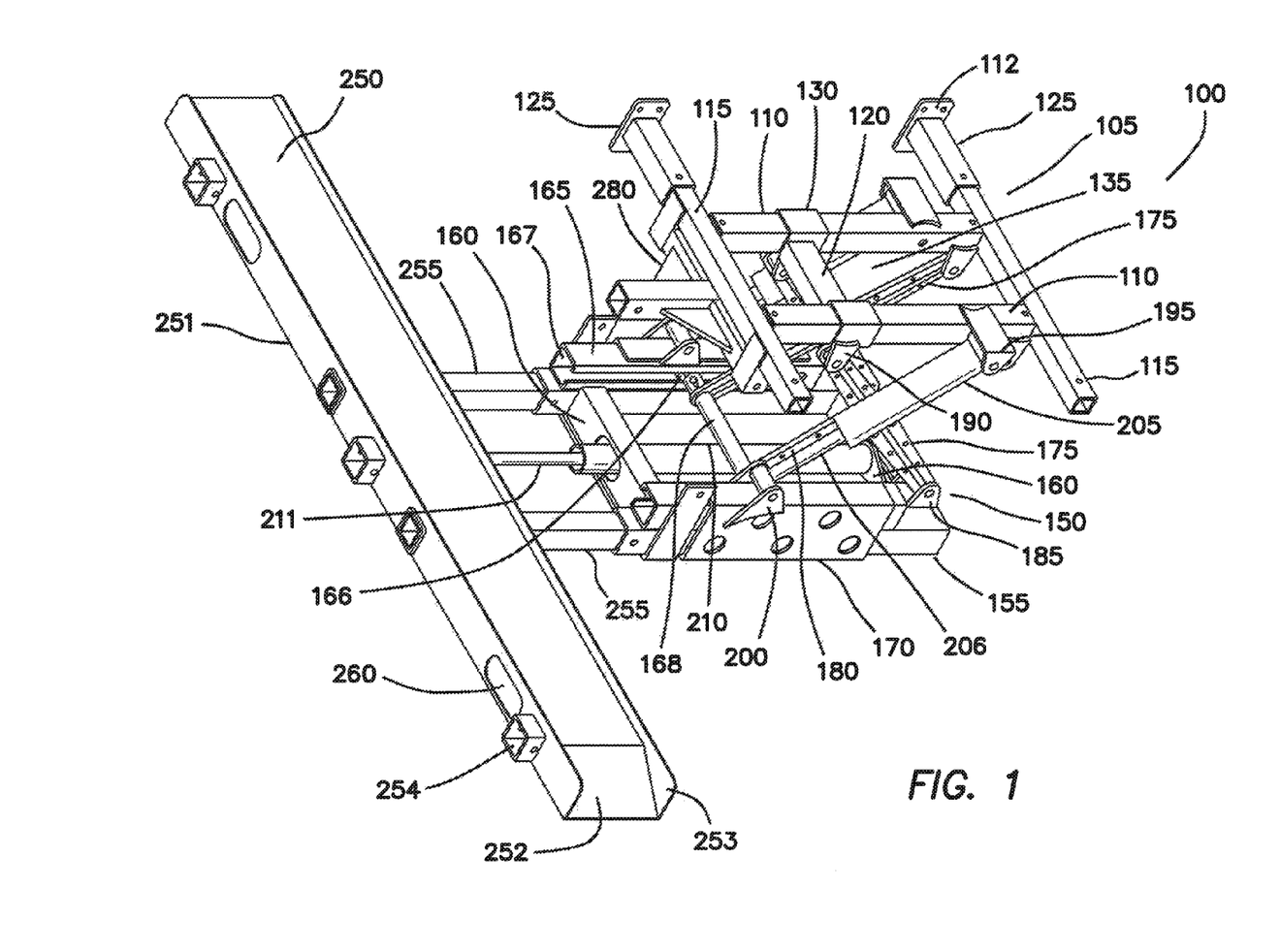
FIG. 1 illustrates a perspective view of a lift hauler according to the embodiments of the present invention.
Figure 2:
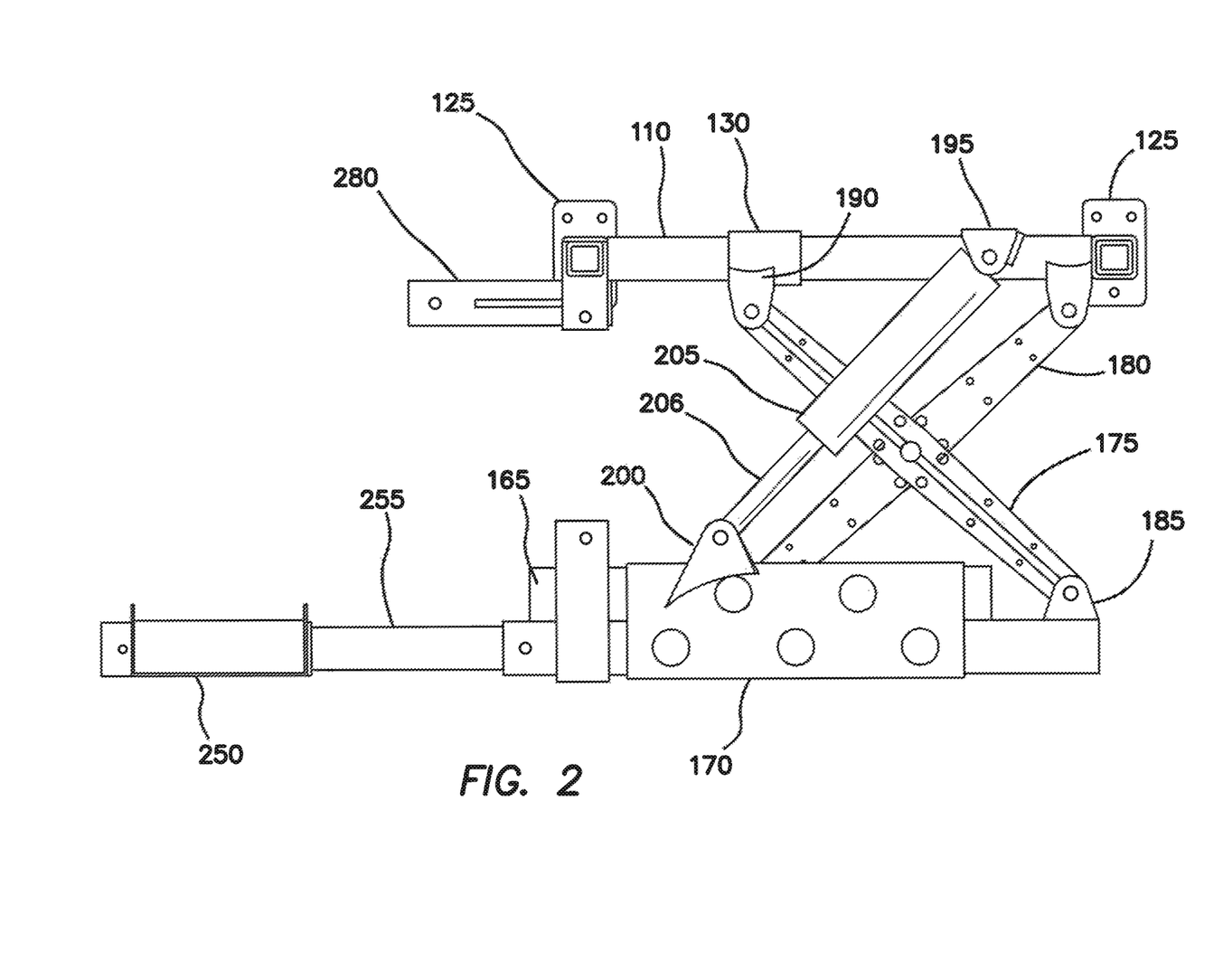
FIG. 2 illustrates a side view of a lift hauler according to the embodiments of the present invention.
Figure 3A:
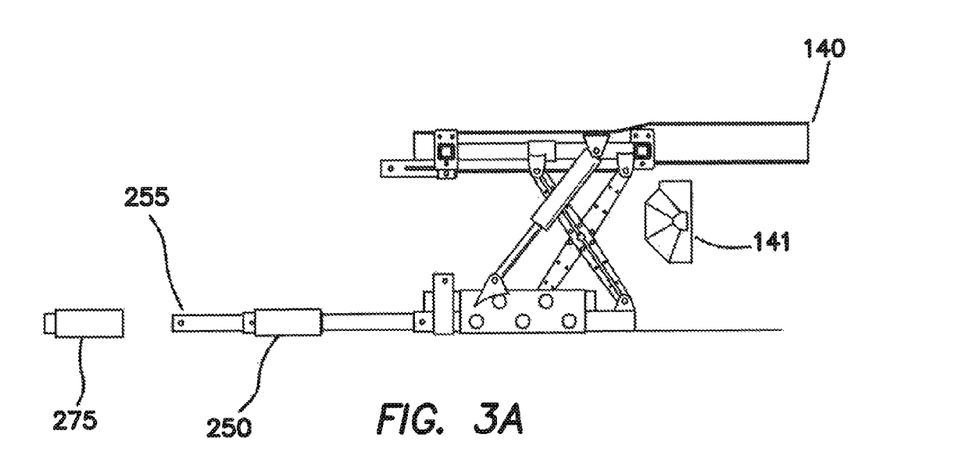
FIGS. 3a-3d illustrate side, rear, perspective and top views of a lift hauler relative to a vehicle frame member according to the embodiments of the present invention.
Figure 3B:
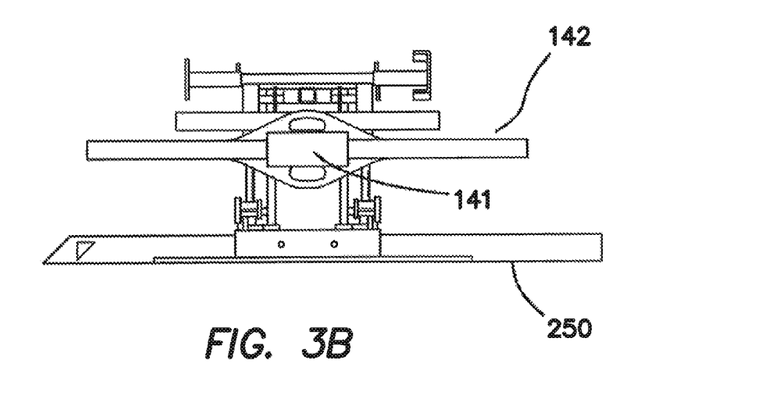
Figure 3C:
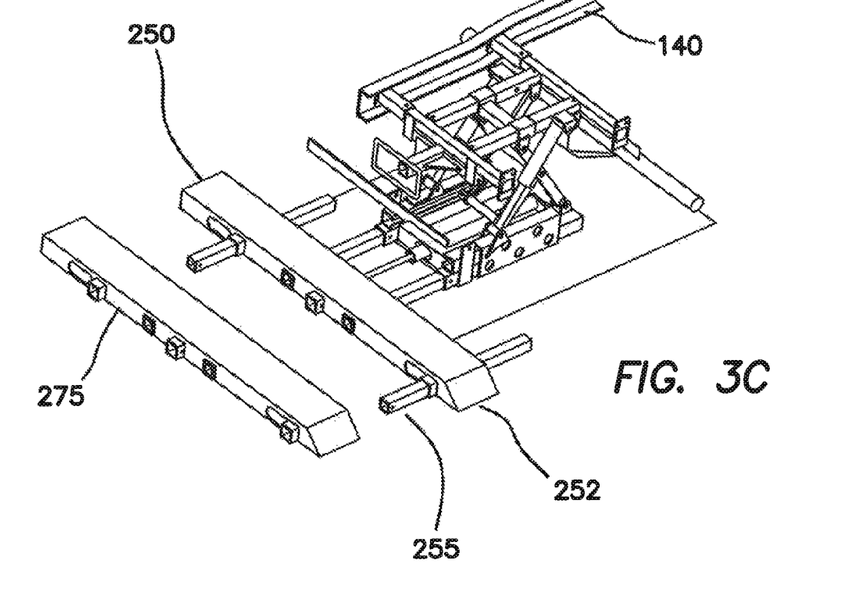
Figure 3D:
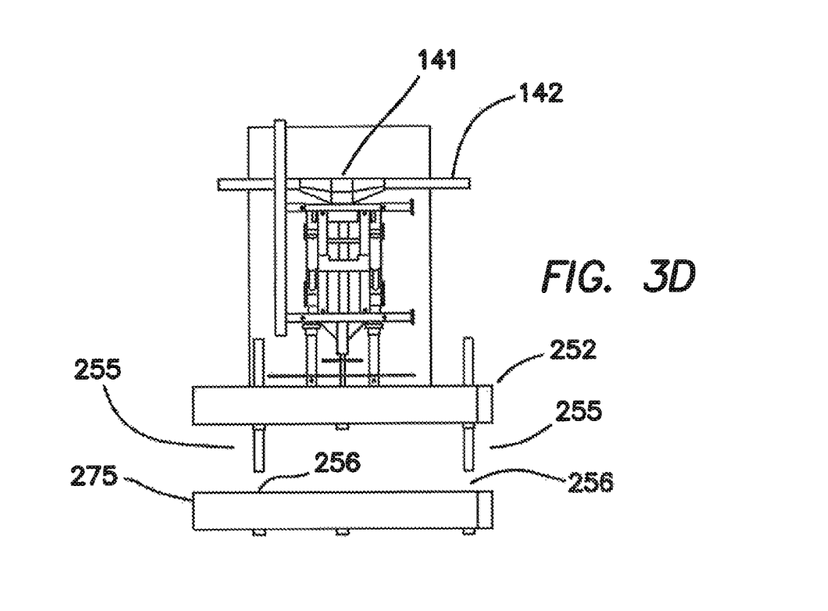
Figure 4:
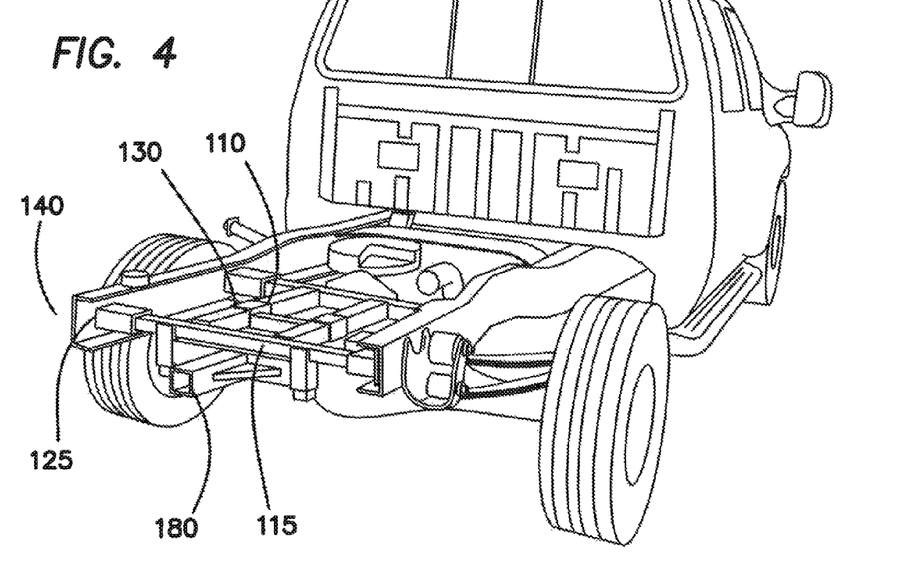
FIG. 4 illustrates a perspective view of a lift hauler installed on a vehicle according to the embodiments of the present invention.

FIGS. 1 and 2 show perspective and side views, respectively, of a lift hauler 100 according to the embodiments of the present invention. Upper frame assembly 105 is configured to attach the lift hauler 100 to the frame of a vehicle. The upper frame assembly 105 comprises a pair of lateral frame rails 110, a pair of cross frame arms 115, slide member 120 and end caps 125. The lateral frame rails 110 are connected to the cross frame arms 115 to form a rigid, generally rectangular structure. The slide member 120 comprises a pair of collars 130 configured to fit over and slide along the lateral frame rails 110 and a spacer 135 which maintains a strict movement correspondence between the pair of collars 130. End caps 125 (only two end caps 125 are shown in FIG. 1 but in practice four end caps 125 are present as shown in FIGS. 3a-3d) are attached to a vehicle frame member via welds, bolts through bolt openings 112 or the like. As shown in FIGS. 3a-3d and 4, the end caps 125 are securely connected to C-shaped frame members 140 generally rearward of the vehicle's differential gear box 141 and axle 142. In this manner, the movable components of the lift hauler 100 are free to move as set forth in more detail below.

A lower frame assembly 150 comprises a pair of elongated, lateral collars 155 and a pair of cross frame arms 160 to form a rigid, generally rectangular structure. A pair of rails 165 are positioned atop of, and connected to, the lateral collars 155. Plates 170 provide stability between the pair of rails 165 and lateral collars 155. The plates 170 also protect the internal portions of the rails 165 from debris disturbed while the vehicle is in motion.

Upper frame assembly 105 and lower frame assembly 150 are joined by two sets of link arms 175, 180. The first set of link arms 175 extends from fixed mounts 185 on the lower frame assembly 150 to translatable mounts 190 on collars 130. The second set of link arms 180 extends from fixed mounts 195 on the upper frame assembly 105 to translatable mounts 200. As detailed below, the two sets of link arms 175, 180 act jointly in a scissor action to facilitate raising and lowering the lower frame assembly 150 relative to the fixed upper frame assembly 105.

Two hydraulic pistons 205 (frame pistons) extend between the upper frame assembly 105 to the lower frame assembly 150. The hydraulic pistons 205 serve to move the lower frame assembly 150 downward relative to the fixed upper frame assembly 105. Consequently, the lower frame assembly 150 is moved downward from the vehicle to which the upper frame assembly 105 is attached. More than two pistons or a single piston may serve to move the lower frame assembly as well. Movement of piston arms 206 causes the lower frame assembly 150 to lower such that translatable mounts 190 on collars 130 slide rearward along lateral frame rails 110 while translatable mounts 200 slide rearward along rails 165 thus bringing the link arms 175, 185 together. Consequently, translatable mounts 190, 200 move from forward positions to rearward positions. The most rearward positions of the translatable mounts 190, 200 may be altered to customize the lowermost position of the frame assembly 150 such that the lift hauler platform 250 is at the correct level when ready for loading. In other words, different vehicles have different heights such that the lowermost level of the lift hauler platform 250 may need to be adjusted. Opposite movements occur responsive to the lower frame assembly 105 being moved upward to a non-use position adjacent to the upper frame assembly 105. Translatable mounts 200 move along rails 165 via rollers 166, bearings or similar means set within channels 167 defined by said rails 165. Rod 168 extends between the two rollers 166.

Figure 5:
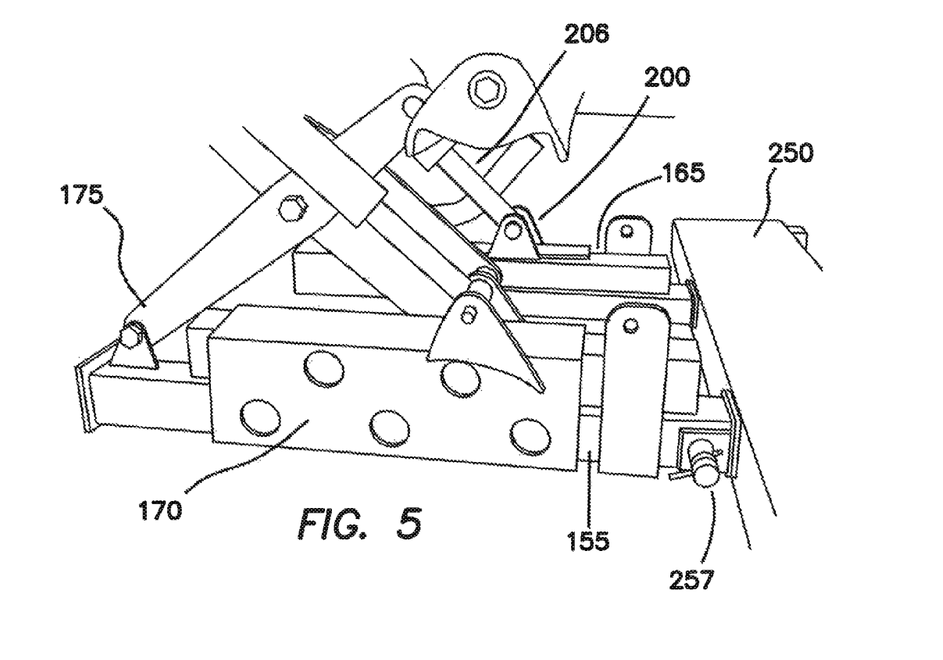
FIG. 5 illustrates a side view of a lower lift hauler assembly and pistons while a lift hauler is installed on a vehicle according to the embodiments of the present invention.
Figure 6:
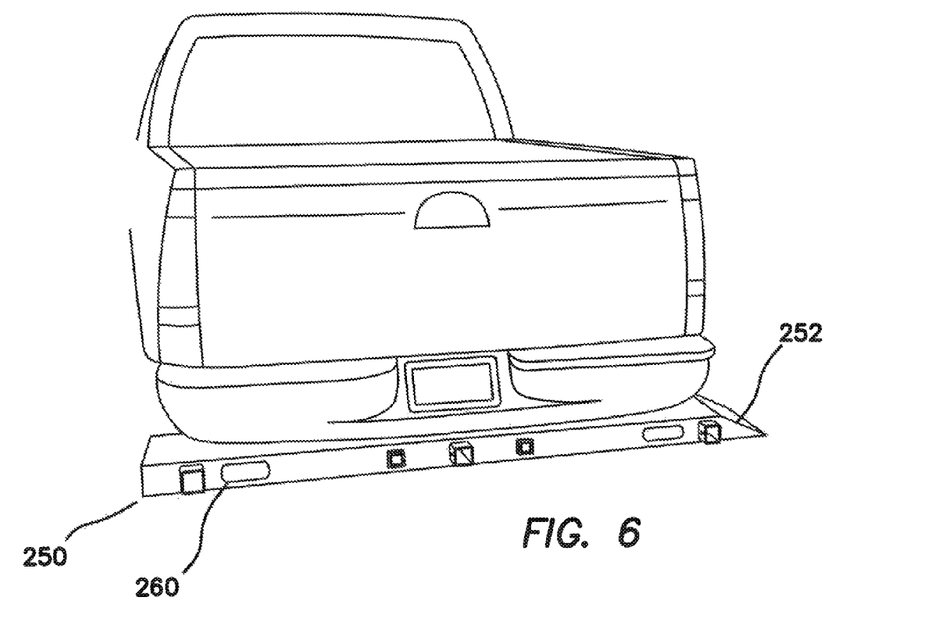
FIG. 6 illustrates a rear view of a lift hauler installed on a vehicle during non-use according to the embodiments of the present invention.
Figure 7:
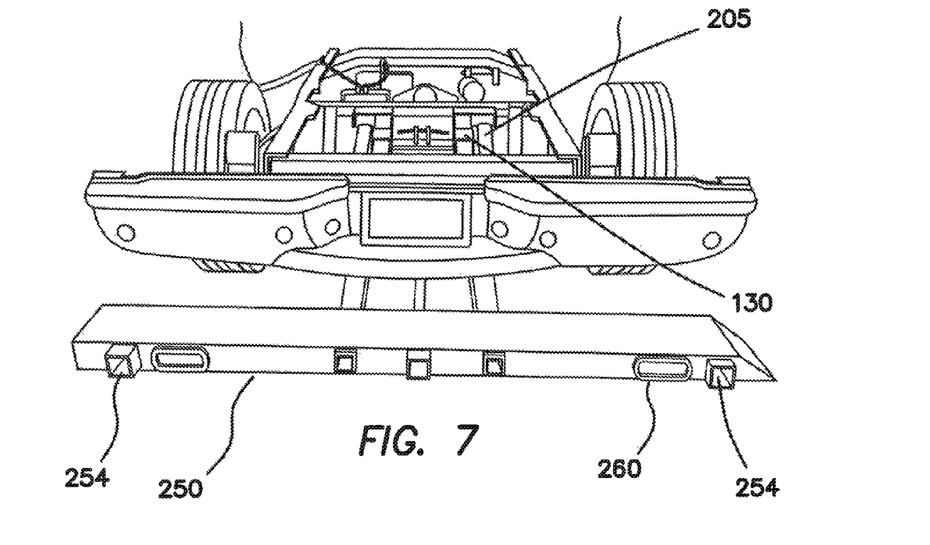
FIG. 7 illustrates a rear view of a lift hauler installed on a vehicle ready for use according to the embodiments of the present invention.

Hydraulic piston 210 (lift hauler platform piston) is supported by the cross frame arms 160. A piston arm 211 connects to a lift hauler platform 250 such that said piston arm 211 controls a horizontal position of the lift hauler platform 250. Extension members 255 slidably reside within lateral collars 155 and support the lift hauler platform 250 and large items placed on said lift hauler platform 250. As shown in FIG. 5, spring pins 257, dowels and locks, nuts and bolts, etc., securely connect the lift hauler platform 250 to the lower frame assembly 160. As shown in FIG. 6, when not in use, the lift hauler platform 250 is positioned beneath the vehicle with a rear surface 251 generally flush with a rear vehicle bumper. As shown in FIG. 7, when in use the lift hauler platform 250 extends rearward of the vehicle. Brake/rear lights 260 integrated on said lift hauler platform 250 allow the lift hauler platform 250 to be linked to the vehicle's brake system. The brake/rear lights 260 are ideal for garnering the attention of other drivers to the vehicle's status whether the lift hauler 100 is being used or not. During use, the brake/rear lights 260 are especially advantageous given that the large items may obstruct the vehicle's standard brake lights. During non-use, the brake/rear lights 260 act as an enhancement to the vehicle's standard brake/rear lights. The brake/rear lights 260 are electrically connected to the vehicle's braking system and may be driven by the vehicle's battery or a separate battery.

Figure 8:
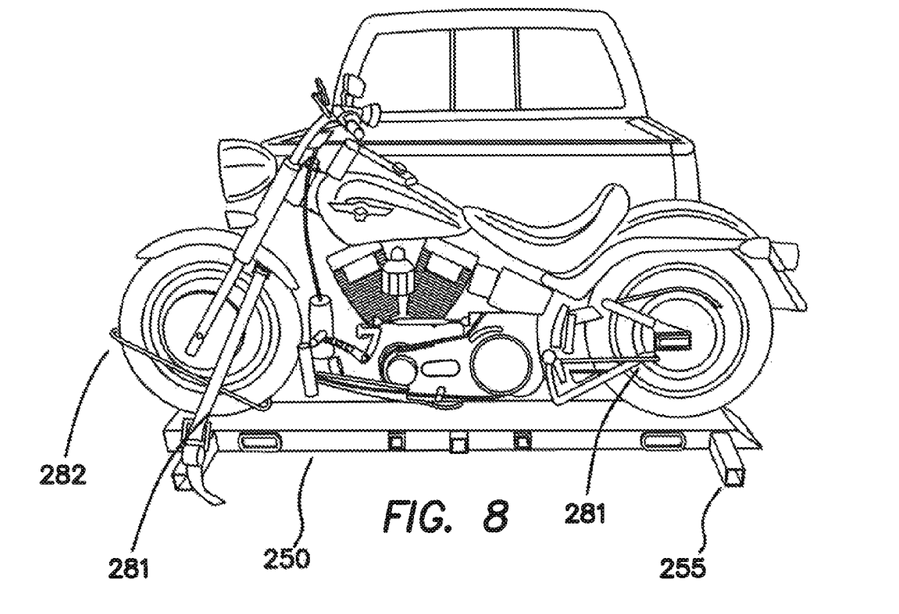
FIGS. 8 and 9 illustrate rear and perspective views, respectively, of a lift hauler installed on a vehicle with a motorcycle restrained thereon according to the embodiments of the present invention.
Figure 9:
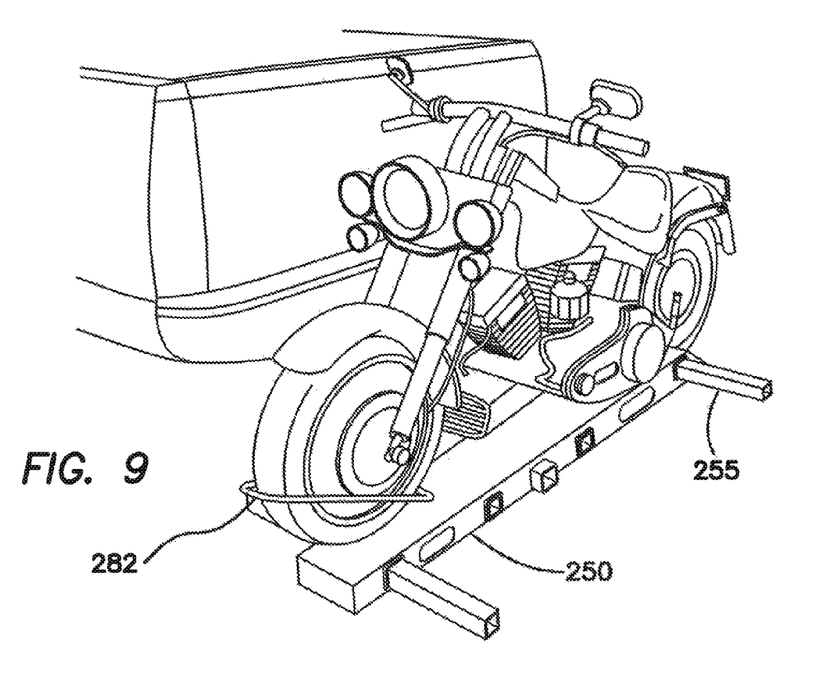

In one embodiment, the lift hauler platform 250 includes a ramp 252 at one end for facilitating loading of a motorcycle as shown in FIGS. 8 and 9. Guides 253 along edges of the lift hauler platform 100 maintain the motorcycle on the lift hauler platform 100 as it is loaded. As shown in FIGS. 3a-3d, the lift hauler platform 250 is configured to receive a platform extender 275 which allows the lift hauler platform 250 to be widened such that the lift hauler platform 250 can transport wider large items such as jet skis, wave runners and the like. Channels 254 receive posts 255 which receives a platform extender 275 via channels 256. Spring pins, dowels and locks, nuts and bolts, etc., securely connect the platform extender 275 to the lift hauler platform 250.

Loading the lift hauler 100 is accomplished by lowering the lower frame assembly 160 using hydraulic pistons 205 and extending lift hauler platform 250 rearward using hydraulic piston 210. Lowering the lower frame assembly 160 moves the lift hauler platform 250 onto the ground rearward of the vehicle. Lowering the lower frame assembly 160 is accomplished by driving the piston arms 206 thereby forcing the lower frame assembly 160 downward from the upper frame assembly 105. Ends of link arms 175, 180 move rearward via translatable mounts 190,200. Activation of piston 210 forces the lift hauler platform 250 rearward from beneath the vehicle to a point rearward of the vehicle. The motorcycle (or other large items) may then be loaded onto, and secured to, the lift hauler platform 250. As shown in FIGS. 8 and 9, straps 281 and wheel supports 282 may be used to secure the motorcycle. Those skilled in the art will recognize that other means may be used as well. Also, extender posts 255 may also be attached and used to tie off straps rather then to support the lift hauler platform extender 275.

A trailer hitch connector 280 is also incorporated on the upper frame assembly 105. When installed, the trailer hitch connector 280 is positioned accordingly near the rear of the vehicle.

Operation of the hydraulic pistons 205,210 is facilitated by the one or more hydraulic pumps (not shown) and tubing (not shown). The tubing connects the one or more hydraulic pumps to the hydraulic pistons 205,210 creating a conventional hydraulic system whereby compressed hydraulic fluid controls the piston arms 206,211. A remote control or vehicle-installed controller is configured to allow a user to operate the lift hauler 100 via an electrical connection with the hydraulic pump.

Although the invention has been described in detail with reference to several embodiments, additional variations and modifications exist within the scope and spirit of the invention as described and defined in the following claims.

I claim:

1. A lift hauler comprising:
a lower frame assembly;
an upper frame assembly configured to affix to a frame of a vehicle such that said lower frame assembly and upper frame assembly are substantially positioned beneath said vehicle when in a home position and when in use;
a lift hauler platform for supporting a vehicle such that the vehicle is not in contact with the ground;
two frame pistons extending from said upper frame assembly to said lower frame assembly, said one or more pistons configured to move said lower frame assembly relative to said upper frame assembly between an upper position and lower position;
a first pair of spaced link arms including (i) a first link arm extending between a fixed connection near a rear of a first horizontal member of said lower frame assembly and a translatable connection with a first horizontal member of said upper frame assembly and (ii) a second link arm extending between a fixed connection near a rear of said first horizontal member of said upper frame assembly and a translatable connection with said first horizontal member of said lower frame assembly, said second link arm extending substantially in parallel with a first of said two pistons;
a second pair of spaced link arms including (i) a first link arm extending between a fixed connection near a rear of a second horizontal member of said lower frame assembly and a translatable connection with a second horizontal member of said upper frame assembly and (ii) a second link arm extending between a fixed connection near a rear of said second horizontal member of said upper frame assembly and a translatable connection with said second horizontal member of said lower frame assembly, said second link arm extending substantially in parallel with a second of said two pistons;

a first spacer extending between and substantially perpendicular to said first and second horizontal members of said upper frame assembly, said first spacer joining translatable ends of the first and second pair of link arms connected to the first and second horizontal members of the upper frame assembly, said first spacer translatable along said first and second horizontal member of said upper frame assembly;

a second spacer extending between and substantially perpendicular to said first and second horizontal members of said lower frame assembly, said second spacer joining translatable ends of the first and second pair of link arms connected to the first and second horizontal members of the lower frame assembly, said second spacer translatable along said first and second horizontal member of said lower frame assembly;

one or more lift hauler platform pistons extending from said lower frame assembly to said lift hauler platform, said one or more pistons configured to move said lift hauler platform relative to said lower frame assembly between a home position beneath said vehicle to a use position rearward of said vehicle; and means for driving said one or more frame pistons and lift hauler platform pistons.

2. The lift hauler of claim 1 further comprising one or more sets of link arms extending between said upper frame assembly and lower frame assembly.

3. The lift hauler of claim 1 further comprising brake lights integrated on said lift hauler platform.

4. The lift hauler of claim 1 further comprising end caps connected to cross frame arms of said upper frame assembly, said end caps configured to fit into, and attach to, rails of a vehicle frame.

5. The lift hauler of claim 1 wherein said lift hauler platform includes means for receiving a lift hauler platform extender.

6. The lift hauler of claim 1 further comprising a trailer hitch connection integrated with said upper frame assembly.

7. A lift hauler comprising:
a rectangular lower frame assembly formed of a pair of lateral collars and a pair of cross frame arms;
a rectangular upper frame assembly formed of a pair of lateral frame rails and pair of cross frame arms, said pair of cross frame arms each supporting end caps at each end thereof, said end caps configured to facilitate affixing said upper frame assembly to a frame of a vehicle such that said lower frame assembly and upper frame assembly are substantially positioned beneath said vehicle when in a home position and when in use;
a lift hauler platform having a ramp at one end and brake lights, said lift hauler configured to support a vehicle such that the vehicle is not in contact with the ground;
two frame pistons extending from said upper frame assembly to said lower frame assembly, said one or more pistons configured to move said lower frame assembly relative to said upper frame assembly between an upper position and lower position;
a first pair of spaced link arms including (i) a first link arm extending between a fixed connection near a rear of a first horizontal member of said lower frame assembly and a translatable connection with a first horizontal member of said upper frame assembly and (ii) a second link arm extending between a fixed connection near a rear of said first horizontal member of said upper frame assembly and a translatable connection with said first horizontal member of said lower frame assembly, said second link arm extending substantially in parallel with a first of said two pistons;

a second pair of spaced link arms including (i) a first link arm extending between a fixed connection near a rear of a second horizontal member of said lower frame assembly and a translatable connection with a second horizontal member of said upper frame assembly and (ii) a second link arm extending between a fixed connection near a rear of said second horizontal member of said upper frame assembly and a translatable connection with said second horizontal member of said lower frame assembly, said second link arm extending substantially in parallel with a second of said two pistons;

a first spacer extending between and substantially perpendicular to said first and second horizontal members of said upper frame assembly, said first spacer joining translatable ends of the first and second pair of link arms connected to the first and second horizontal members of the upper frame assembly, said first spacer translatable along said first and second horizontal member of said upper frame assembly;

a second spacer extending between and substantially perpendicular to said first and second horizontal members of said lower frame assembly, said second spacer joining translatable ends of the first and second pair of link arms connected to the first and second horizontal members of the lower frame assembly, said second spacer translatable along said first and second horizontal member of said lower frame assembly;

one or more lift hauler platform pistons extending from said lower frame assembly to said lift hauler platform, said one or more pistons configured to move said lift hauler platform relative to said lower frame assembly between a home position beneath said vehicle to a use position rearward of said vehicle; and means for driving said one or more frame pistons and lift hauler platform pistons.

8. The lift hauler of claim 7 further comprising one or more sets of link arms extending between said upper frame assembly and lower frame assembly.

9. The lift hauler of claim 7 wherein said lift hauler platform includes means for receiving a lift hauler platform extender.

10. The lift hauler of claim 7 further comprising a trailer hitch connection integrated with said upper frame assembly.

11. A lift hauler comprising:
a lower frame assembly;
an upper frame assembly configured to affix to a frame of a vehicle such that said lower frame assembly and upper frame assembly are substantially positioned beneath said vehicle when in a home position and when in use;
a lift hauler platform for supporting a vehicle such that the vehicle is not in contact with the ground;
two frame pistons extending from said upper frame assembly to said lower frame assembly, said one or more pistons configured to move said lower frame assembly relative to said upper frame assembly between an upper position and lower position;
a first set of link arms extending between fixed mounts on a rear of said lower frame assembly and translatable collars on said upper frame assembly and a second set of translatable link arms extending between fixed mounts on a rear of said upper frame assembly and translatable mounts on said lower frame assembly;

a first spacer extending between and substantially perpendicular to said translatable collars on said upper frame assembly;

a second spacer extending between and substantially perpendicular to said translatable mounts on said lower frame assembly;

one or more lift hauler platform pistons extending from said lower frame assembly to said lift hauler platform, said one or more pistons configured to move said lift hauler platform relative to said lower frame assembly between a home position beneath said vehicle to a use position rearward of said vehicle; and means for driving said one or more frame pistons and lift hauler platform pistons.

12. The lift hauler of claim 11 further comprising brake lights integrated on said lift hauler platform.

13. The lift hauler of claim 11 further comprising end caps connected to cross frame arms of said upper frame assembly, said end caps configured to fit into, and attach to, rails of a vehicle frame.

14. The lift hauler of claim 11 wherein said lift hauler platform includes means for receiving a lift hauler platform extender.

15. The lift hauler of claim 11 further comprising a trailer hitch connection integrated with said upper frame assembly.

* * * * *